(12) United States Patent
Schubert et al.

(10) Patent No.: US 7,342,728 B2
(45) Date of Patent: Mar. 11, 2008

(54) FRESNEL LENS, BACKPROJECTION SCREEN, AND CORRESPONDING BACKPROJECTION SYSTEM AND UNIT

(75) Inventors: Arno Schubert, Chevaigne (FR); Pascal Benoit, Liffre (FR)

(73) Assignee: Thomson Licensing, Boulogne Billancourt (FR)

( * ) Notice: Subject to any disclaimer, the term of this patent is extended or adjusted under 35 U.S.C. 154(b) by 262 days.

(21) Appl. No.: 10/557,493

(22) PCT Filed: May 17, 2004

(86) PCT No.: PCT/FR2004/050199

§ 371 (c)(1),
(2), (4) Date: Nov. 21, 2005

(87) PCT Pub. No.: WO2004/106992

PCT Pub. Date: Dec. 9, 2004

(65) Prior Publication Data

US 2007/0091466 A1    Apr. 26, 2007

(30) Foreign Application Priority Data

May 20, 2003   (FR) ................................. 03 06064

(51) Int. Cl.
*G02B 3/08* (2006.01)
*G03B 21/60* (2006.01)
(52) U.S. Cl. ..................... 359/742; 359/457
(58) Field of Classification Search ............. 359/742
See application file for complete search history.

(56) References Cited

U.S. PATENT DOCUMENTS 4,824,227 A    4/1989   Goldenberg et al.
5,191,472 A    3/1993   Kurematsu et al.
5,432,636 A    7/1995   Ishii et al.

(Continued)

FOREIGN PATENT DOCUMENTS

EP    0333333    9/1989

(Continued)

OTHER PUBLICATIONS

Patent Abstracts of Japan, vol. 015, No. 192, May 17, 1991 & JP 03-045988 (See Ref. AH).

(Continued)

*Primary Examiner*—Jordan Schwartz
*Assistant Examiner*—James C Jones
(74) *Attorney, Agent, or Firm*—Joseph J. Laks; Harvey D. Fried; Patricia Verlangieri

(57) ABSTRACT

The invention relates to a Fresnel lens. Each refractive structure of the lens is bounded by two surfaces, the second surface making a second angle with the normal to the plane of incidence. At least two zones of refractive structures are provided in which the second angle is equal to the entrance angle of a beam. Each first surface refracts the light along a direction parallel or not parallel to the axis of the lens depending on the zone. The invention also relates to a system comprising a folding mirror and a Fresnel lens, in which system the second angle is equal to the entrance angle of a parasitic ray obtained by reflection on the Fresnel lens and then on the mirror. The invention also relates to a corresponding back projection screen and a corresponding back projection unit.

18 Claims, 8 Drawing Sheets

U.S. PATENT DOCUMENTS

Figure 4A:
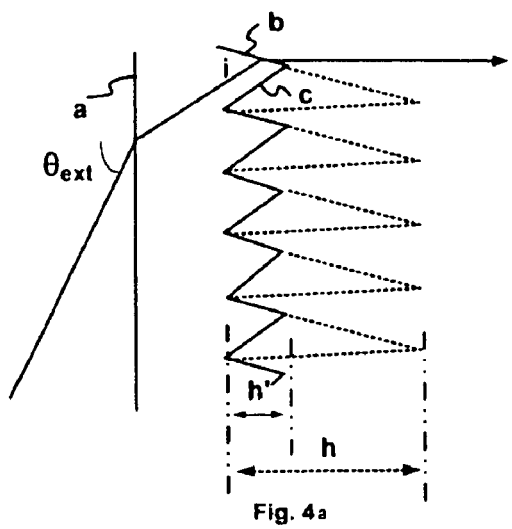

2002/0181099 A1   12/2002   Lin et al.
2005/0105177 A1*   5/2005   Suzuki et al. ............... 359/457

FOREIGN PATENT DOCUMENTS

| EP | 0819973 | 1/1998 |
|----|---------|--------|
| JP | 59000101 | 1/1984 |
| JP | 3-045988 | 2/1991 |
| JP | 3-311540 | 9/1991 |
| JP | 4-322202 | 11/1992 |
| JP | 2002-365732 | 12/2002 |
| WO | WO 99/13378 | 3/1999 |

OTHER PUBLICATIONS

Patent Abstracts of Japan, vol. 015, No. 487, Dec. 10, 1991 & JP 03-211540 (See Ref. AI).
Patent Abstracts of Japan, vol. 017, No. 157, Mar. 26, 1993 & JP 04-322202 (See Ref. AJ).
Patent Abstracts of Japan, vol. 2003, No. 04, Apr. 2, 2003 & JP 2002-365732 (See Ref. AK).
Patent Abstracts of Japan, vol. 008, No. 082, Apr. 14, 1984 & JP 59-000101 (See Ref. AL).
Search Report Dated Jan. 28, 2005.

* cited by examiner

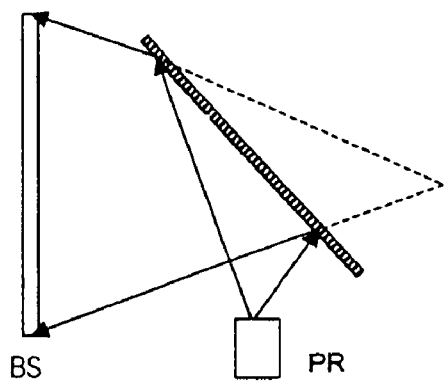
FIG. 1
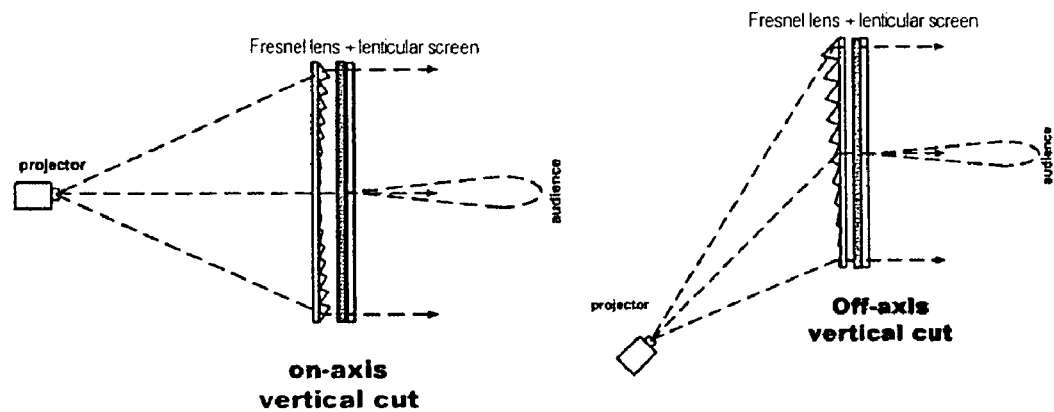
Fig. 2a
Fig. 2b
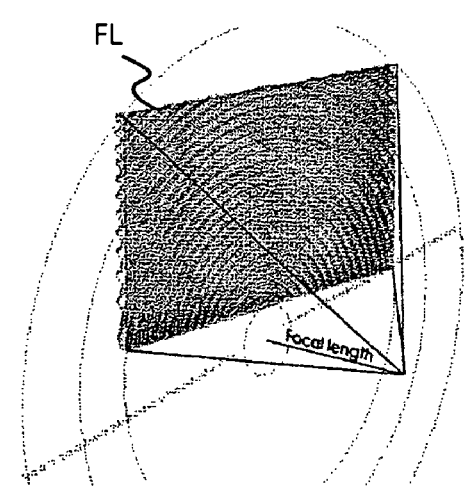
Fig. 3a
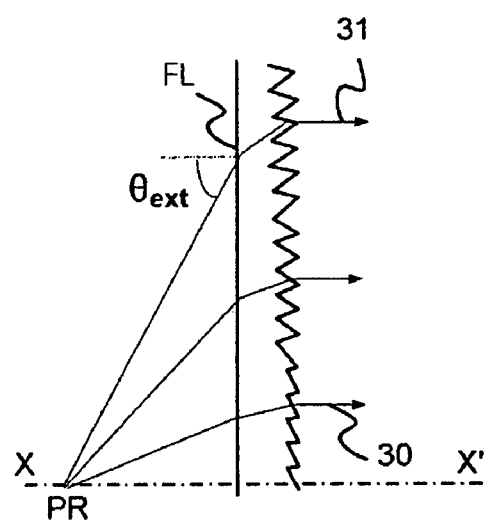
Fig. 3b

FRESNEL LENS, BACKPROJECTION SCREEN, AND CORRESPONDING BACKPROJECTION SYSTEM AND UNIT

1. FIELD OF THE INVENTION

The invention applies to the field of Fresnel lenses designed to be used in a backprojection system. It also applies to backprojection screens, to a backprojection unit and to corresponding systems.

2. PRIOR ART

A backprojection screen comprises mainly two components, namely a Fresnel lens that focuses or collimates the light and an array of lenses that delivers the light to the viewers.

In a standard configuration, the projector is placed on the axis of the screen. The numerical aperture of a Fresnel lens is limited to about 0.6. The main reasons for this limit are the losses and the shape of the raised features of the Fresnel lens at high angles of incidence.

Moreover, to obtain a compact backprojection system, a system of deflection mirrors (FIG. 1) for folding the beam between the projector and the backprojection screen is provided. The thickness or depth of such a projector can be reduced to one third of the diagonal of the screen. For example, in 16/9 format, a thickness of 17 inches can be obtained for a 50-inch diagonal screen.

If we wish to further reduce the thickness of a television backprojection unit, it is possible to provide for example off-axis projection onto the rear face of the backprojection screen. In this way, it is possible to reduce the thickness of the unit to only one fifth of the screen diagonal. FIGS. 2a and 2b show on-axis and off-axis backprojection units respectively.

One of the main problems to be solved in an off-axis configuration, or in a configuration in which the image to be projected onto the screen is off-centre relative to the axis of the projector objective, is how to ensure that all the light projected onto the screen is retransmitted to the viewers and that the emission is the most uniform possible. In particular, this involves reducing the Fresnel lens losses, which tend to increase when the angle of incidence of the illuminating light on the Fresnel lens increases.

Various Fresnel lens structures have been proposed for solving this problem, but the known structures generally have complicated relief features for the Fresnel lens and result in lenses that are relatively difficult to produce, and are therefore expensive.

Patent application JP 59-000101 discloses a Fresnel lens in which the faces of the prisms constituting the Fresnel lens make angles that are large enough to allow the lens to be easily demoulded when it is manufactured by moulding. More precisely, in the above document one of the faces of each structure of the lens is parallel to the incident light rays. However, the operation of such a lens is limited when it is illuminated at high angles of incidence and when these angles vary within a wide range of angles.

3. SUMMARY OF THE INVENTION

The invention therefore relates to a Fresnel lens which has a structure that is simple and easy to produce on an industrial scale and which allows operation at large angles of incidence.

The invention therefore relates to a Fresnel lens comprising:
a first face lying in a plane; and
opposite this face, a second face parallel to the first face and including circular concentric refractive structures.
Each refractive structure is defined by:
a first surface intended to form a refractive diopter and making a first angle ($\alpha$) with the said plane (P) and
a second surface without optical purpose and making a second angle ($\beta$) with the normal to the said plane, each said structure being intended to be illuminated by a beam making an entrance angle ($\theta_{int}$) different from zero degrees with the normal to the said plane.

The second face has several zones of refractive structures, for example at least two zones, distributed between the centre of the concentric refractive structures and the periphery of the Fresnel lens:
a first zone close to the centre, in which:
  ○ the first angle ($\alpha$) of each first surface is such that the refractive structures refract the beam along a direction making a zero angle ($\theta_{out}$) relative to a defined direction and
  ○ the second angle ($\beta$) of each second surface is equal to the said entrance angle ($\theta_{int}$);
a second zone in which:
  ○ the first angle ($\alpha$) of each first surface is such that the refractive structures refract the beam along a direction making a non-zero angle ($\theta_{out}$) smaller than a maximum value ($\theta_{max}$) relative to the defined direction and
  ○ the second angle ($\beta$) of each second surface is equal to the said entrance angle ($\theta_{int}$).

According to an alternative embodiment, the lens includes a third zone located between the second zone and the periphery of the Fresnel lens, in which third zone:
the first angle ($\alpha$) of each first surface is such that the refractive structures refract the light along a direction making a non-zero angle ($\theta_{out}$) equal to the maximum value ($\theta_{max}$) relative to the defined direction; and
the second angle ($\beta$) of each second surface is greater than the entrance angle ($\theta_{int}$).

According to a preferred embodiment, each first surface makes an etching angle ($\zeta$) with each adjacent second surface, this angle having a specified value in both the second and the third zones and having a value greater than this specified value in the first zone.

The following equation is derived directly from the definitions of the angles $\alpha$, $\beta$ and $\zeta$ given above: $\zeta=\beta+\pi/2-\alpha$. In the first zone, the invention provides the highest possible etching angle that meets the manufacturing requirements, while still maintaining perfect collimation ($\theta_{out}=0$), since $\alpha$ remains relatively small in this zone. In this zone, the etching angle remains larger than the specified value. In practice, this angle is generally less than 70°. It may also in general be larger than 40°. According to one particular characterizing feature of the invention, one that is particularly well suited for compact projection, it is between 30° and 40°.

In the second zone, an angle $\alpha$ slightly smaller than the angle that would be needed to obtain perfect collimation is tolerated (a $\theta_{out}$ that is non-zero but less than $\theta_{max}$ is tolerated) so that the etching angle $\zeta$ remains larger than, or preferably equal to, the specified value. In the third zone, although the angle $\alpha$ departs from the angle that would be needed to obtain perfect collimation with a maximum value corresponding to an output angle $\theta_{out}$ equal to $\theta_{max}$, a difference in the angle $\beta$ relative to the entrance angle is however tolerated, but still so that the etching angle ζ again remains larger than, or preferably equal to, the specified value. Thus, the invention makes it possible to provide Fresnel lenses that offer the best compromise between the highest level of optical performance and the lowest level of manufacturing cost thanks to a high etching angle of its refractive structures.

The second zone and, if appropriate, the third zone each have at least one refracting structure.

According to one embodiment of the invention, the first face of the Fresnel lens is preferably plane. This first face is also preferably covered with an antireflection coating optimized for a high angle of incidence, especially 42° or higher.

The refractive structures are preferably circular or almost circular. In one method of application, the beam illuminating the lens are divergent and come from a point (in the absence of optical aberrations) or from an almost point-like zone (in the presence of optical aberrations) located on the axis of the lens or approximately on this axis.

Preferably, the said specified value of the etching angle (ζ) is less than 70°. Preferably, the etching angle (ζ) is approximately between 30 and 50°. According to one embodiment, it is equal to 60° or between 55° and 65°.

According to a preferred characterizing feature of the invention, the Fresnel lens is noteworthy in that the numerical aperture (or f-number) equal at most to twice the ratio of the focal length associated with a point on the lens to the distance of this point from the axis of the lens is equal to 0.55 or less. Thus, a relatively high maximum angle of incidence of the useful imaging optical beam (for example equal to 42° or higher for a numerical aperture of 0.55 or less) may be obtained. This allows relatively flat backprojection units to be manufactured.

The invention is applicable to an image backprojection screen comprising an entrance face and an exit face to be directed towards viewers. A Fresnel lens as defined above is placed along the entrance face of the screen with that face of the lens bearing the diffractive structures directed towards the exit face.

The invention also relates to a system designed for image projection, comprising:
 a source generating an imaging beam;
 a Fresnel lens; and
 an imaging beam deflection mirror designed to send the said imaging beam back to the said Fresnel lens.

The Fresnel lens has:
 a first face (f1) lying in a plane (P); and
 opposite this face, a second face parallel to the first face and having circular concentric refractive structures.

Each refractive structure is bounded by a first surface (b), intended to form a refractive diopter and making a first angle (α) with the said plane (P), and a second surface without optical purpose and making a second angle (β) with the normal to the said plane (P).

The system is noteworthy in that at least one portion of the said structures, forming a first set of structures, is intended to be illuminated by:
 a first beam, called the direct beam, which emanates from the imaging beam and has not been reflected by the first face, the direct beam forming a first incident beam by the said direct beam being transmitted through the Fresnel lens; and
 a second beam, called the parasitic beam, which emanates from the imaging beam and has been reflected by the first face and then by the deflection mirror, the parasitic beam forming a second incident beam by the parasitic beam being transmitted through the Fresnel lens.

The second incident beam makes an entrance angle ($\theta'_{int}$) different from zero degrees with the normal to the said plane (P).

Preferably, the second angle (β) of the second face of each structure of the first set is larger than the entrance angle ($\theta'_{int}$) of the second incident ray less 10 degrees. Furthermore, the second angle (β) of the second face of each structure of the first set is smaller than an upper limit equal to the entrance angle ($\theta'_{int}$) of the second incident ray plus 2 degrees.

Thus, the invention allows the joint use of a folding mirror and a Fresnel lens without impairing the quality of the projected image.

In addition, the first incident beams and most of the second incident beams do not strike the second surface of the refractive structure directly, rather they strike the first surface. Likewise, the first incident beam is refracted along a preferential direction towards a potential viewer. However, the second incident beam, corresponding to a parasitic beam striking the first surface at a different angle of incidence from the first incident beam is refracted in another direction and a viewer will not in general see it. Thus, the quality of the image is improved by eliminating or greatly reducing the phantom images arising in particular from parasitic rays obtained by reflection of a useful imaging beam on the first face of the lens and then on the folding mirror, while still allowing easy manufacture of the Fresnel lens.

Furthermore, the machining of the lens (increasing the tooling therefor) is thus facilitated, while eliminating the parasitic rays.

According to one particular characterizing feature of the invention, the second angle (β) of the second face of each structure of the first set is larger than 5 degrees. Preferably, the second angle (β) of the second face of each structure of the first set is larger than ten degrees.

According to a preferential feature, the second angle (β) of the second face of each structure of the first set is equal to the entrance angle ($\theta'_{int}$) of the second incident ray.

Preferably, the Fresnel lens comprises at least two portions, including:
 a first portion in which the second angle (β) of the second face of each structure of the first set is less than or equal to the entrance angle ($\theta_{int}$) of the second incident ray; and
 a second portion in which the second angle (β) of the second face of each structure of a second set of structures is equal to the entrance angle ($\theta_{int}$) of the first incident ray.

According to an alternative embodiment of the invention, the second portion is divided into two parts not struck by parasitic rays obtained by reflection of an incident ray on the first face of the lens and then on the folding mirror:
 a zone close to the axis of the lens located (in a configuration in which the imaging beam is directed from the bottom upwards) below the lowest reflected ray corresponding to the lower incident beam; and
 a peripheral zone of the lens located above the last ray reflected by the folding mirror, the size of which is preferably limited by the useful part for folding the imaging beam.

According to another alternative embodiment of the invention, the second portion is all in one block and comprises only a peripheral zone. The lens then comprises, for example, a zone close to the axis of the lens of which the second angle (β) of the second face of each structure of a second set of structures is equal to or smaller than a pre-specified value or equal to or smaller than the entrance angle ($\theta_{int}$) of a second incident ray that would have been generated if an imaging beam originating from the source would have been reflected by a downward extension of the Fresnel lens and an extension, also downwards, of the folding mirror.

According to one particular characterizing feature of the invention, the second face comprises at least two zones of refractive structures distributed between the centre of the concentric refractive structures and the periphery of the Fresnel lens:

a first zone close to the centre, in which the first angle ($\alpha$) of each first surface is such that the refractive structures refract the first incident beam along a direction making a zero angle ($\theta_{out}$) relative to a defined direction (XX'); and a second zone in which the first angle ($\alpha$) of each first surface is such that the refractive structures refract the first incident beam along a direction making a non-zero angle ($\theta_{out}$) smaller than a maximum value ($\theta_{max}$) relative to the defined direction (XX').

Preferably, the system further includes a lenticular screen itself comprising filtering means that are transparent for the first incident rays refracted by the Fresnel lens and that filter the second incident rays refracted by the Fresnel lens, the filtering means being juxtaposed with the Fresnel lens. Thus, most of the exiting parasitic rays, especially the rays corresponding to the transmission of the second rays incident via the first surface, are eliminated.

According to a preferred embodiment of the invention, the system includes an image backprojection screen comprising an entrance face and an exit face to be directed towards viewers, the screen comprising the Fresnel lens, this Fresnel lens being placed along the entrance face of the screen with that face of the lens bearing the refractive structures directed towards the exit face of the screen.

According to one embodiment of the invention, the numerical aperture (or f-number) equal at most to twice the ratio of the focal length associated with a point on the lens to the distance of this point from the axis of the said Fresnel lens is equal to 0.55 or less.

Thus, the invention is particularly well suited to thin projectors.

The invention is also applicable to a backprojection unit comprising such a backprojection screen or such a projection system and a projector that emits a light beam towards the entrance face. The projector is preferably placed on the axis of the Fresnel lens and projects an image onto only one portion of the Fresnel lens located on one side of its axis.

According to one embodiment, the pupil of the projector objective lies approximately on the axis of the Fresnel lens, and the optical axis of this objective is directed towards a utilized portion of the Fresnel lens located on one side of the axis of the Fresnel lens.

4. LIST OF FIGURES

Figure 4B:
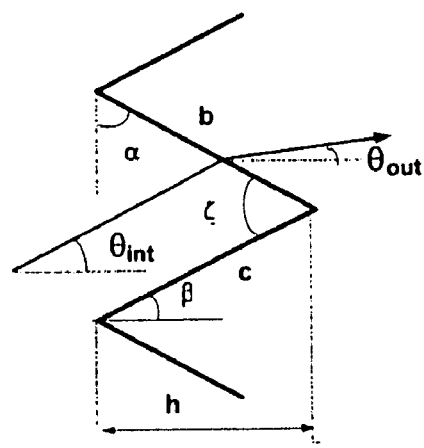
Figure 6A:
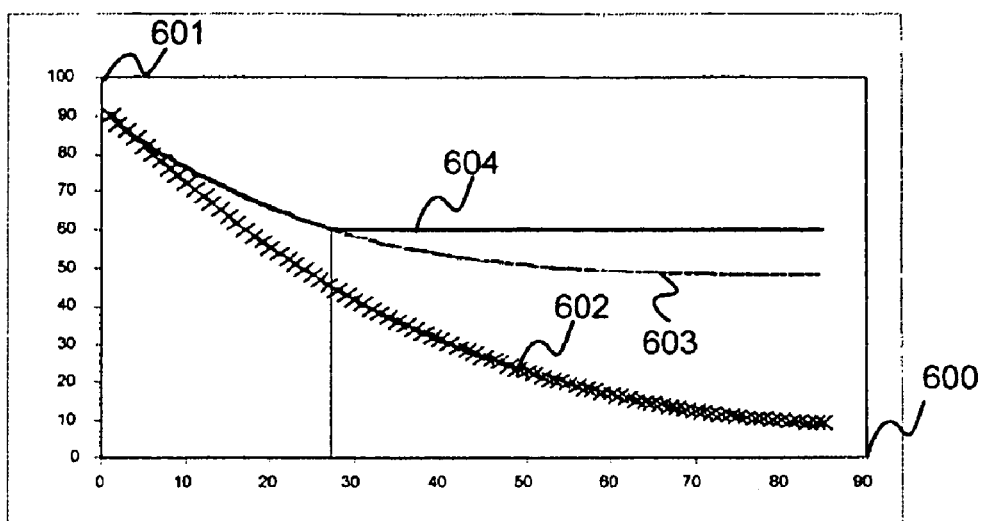
Figure 6B:
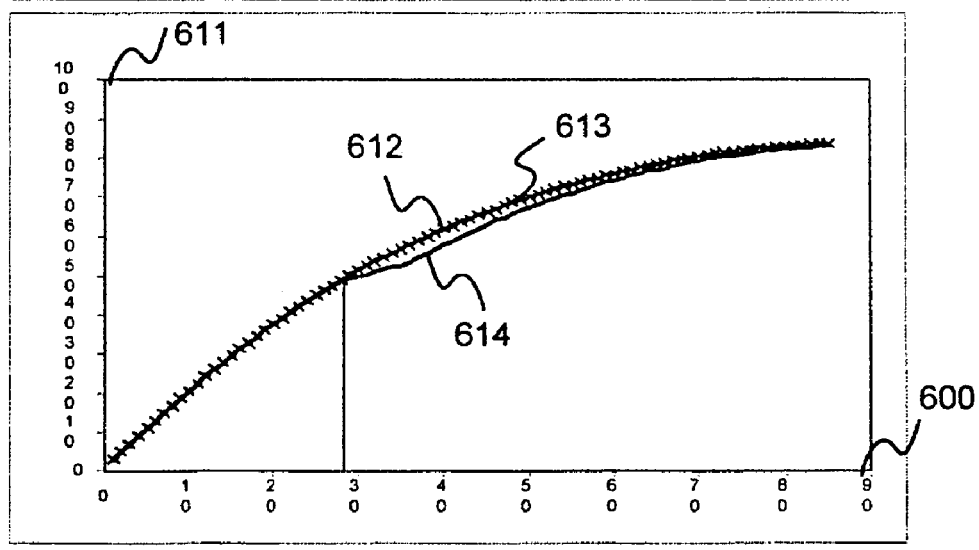
Figure 6C:
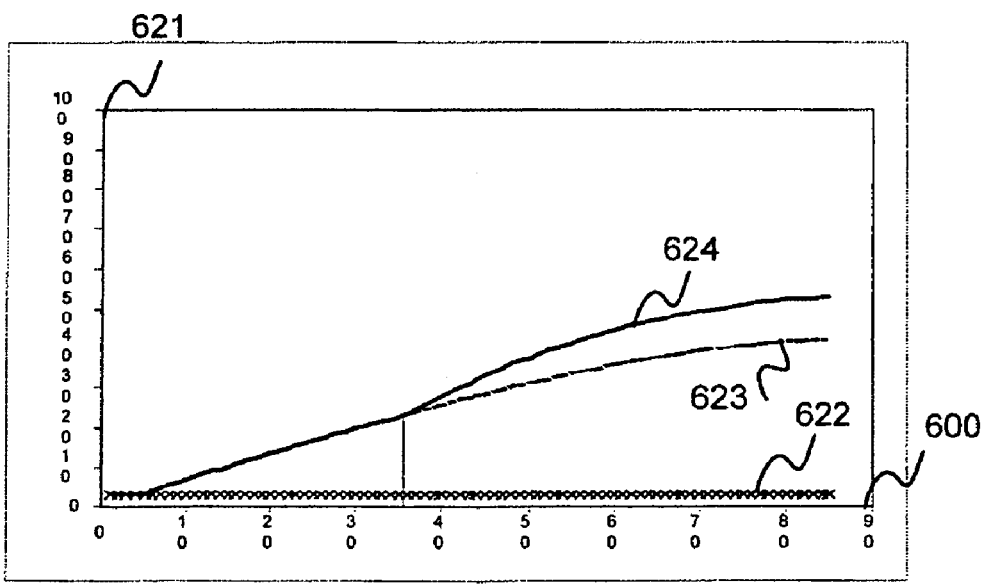
Figure 7:
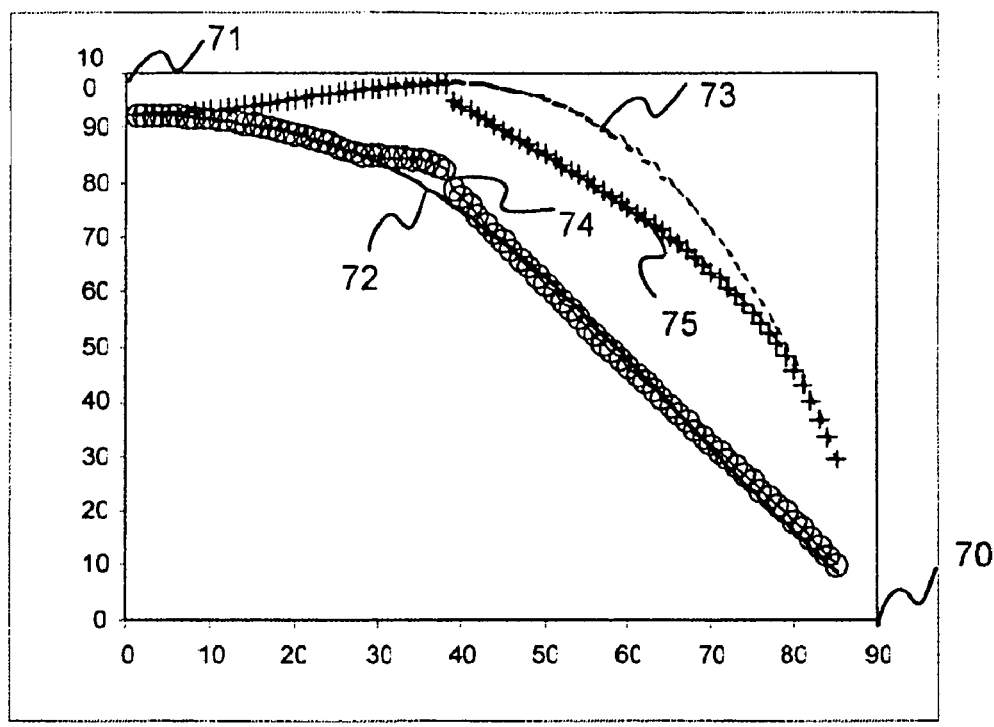
Figure 8:
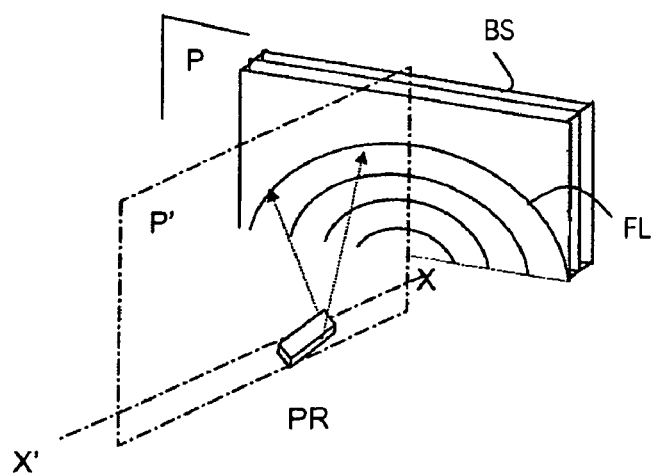
Figure 9:
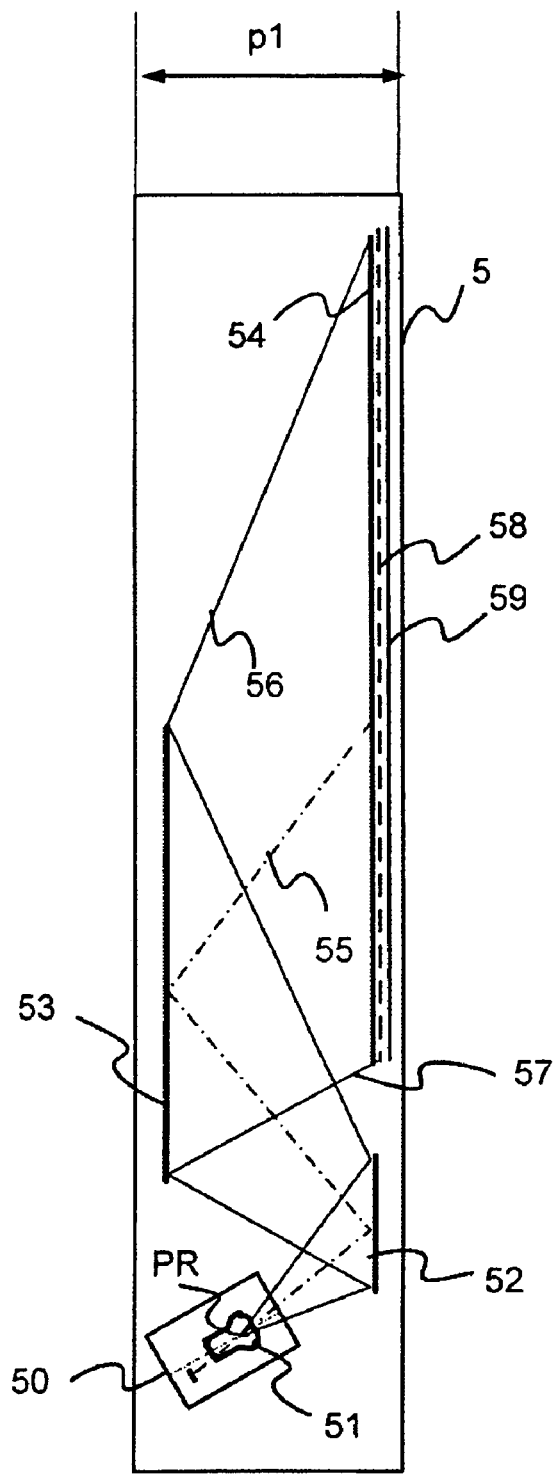
Figure 13:
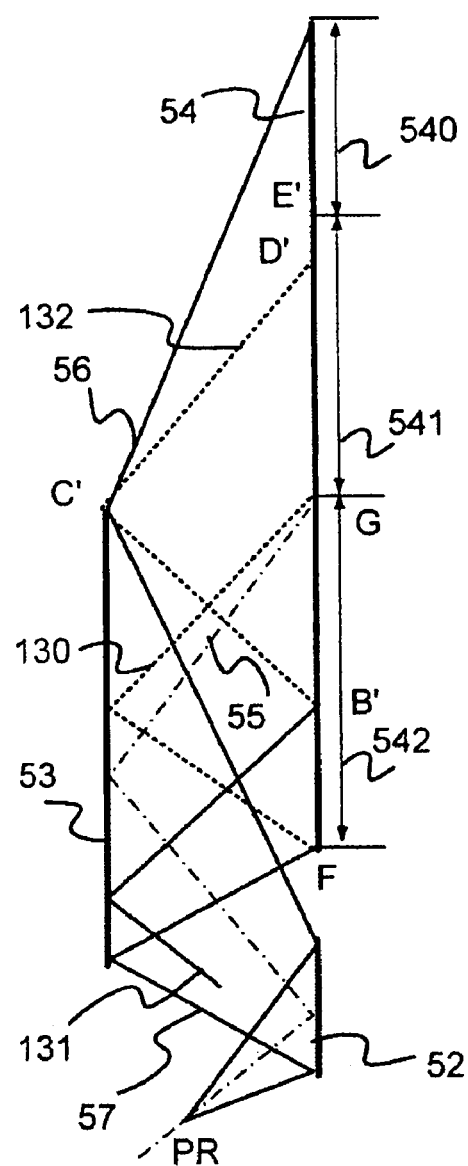
Figure 10:
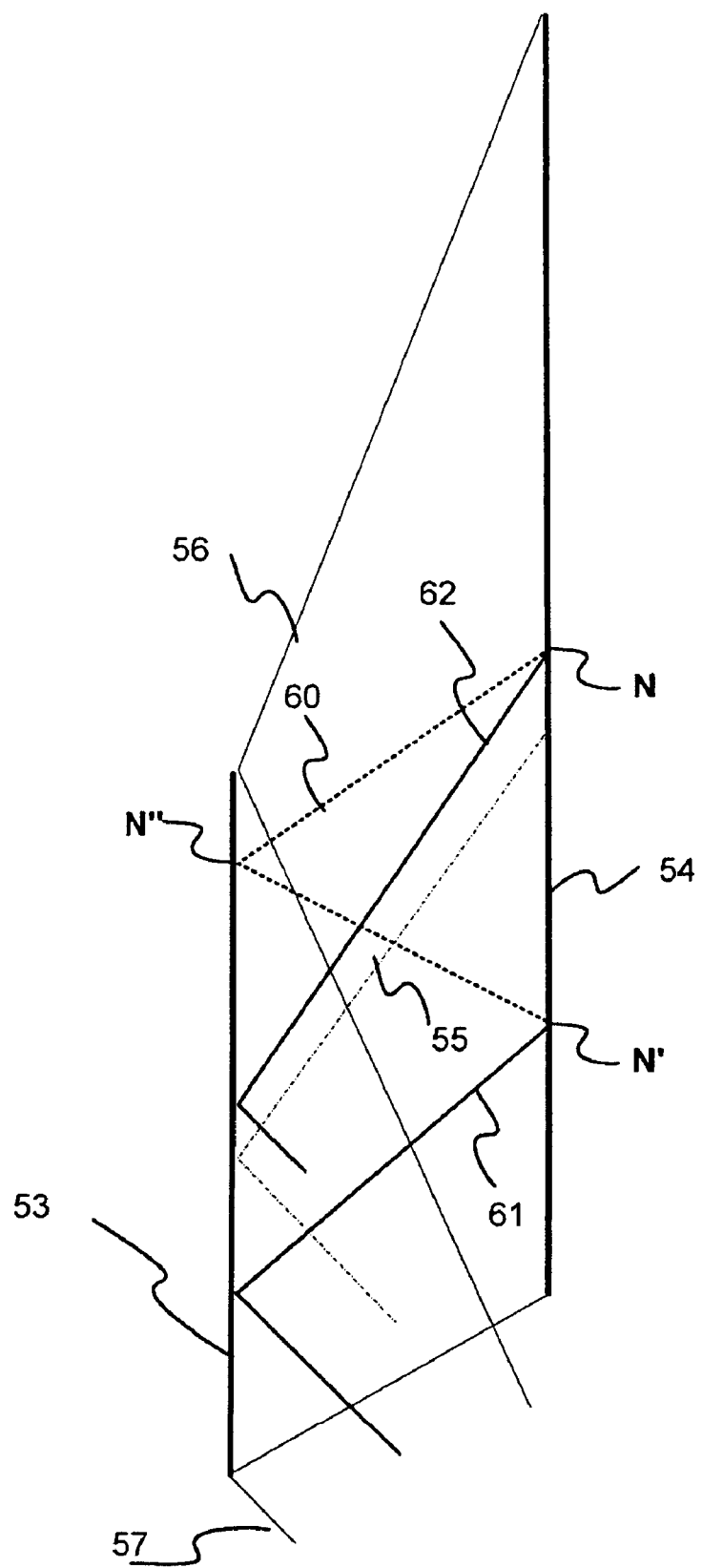
Figures 11, 15:
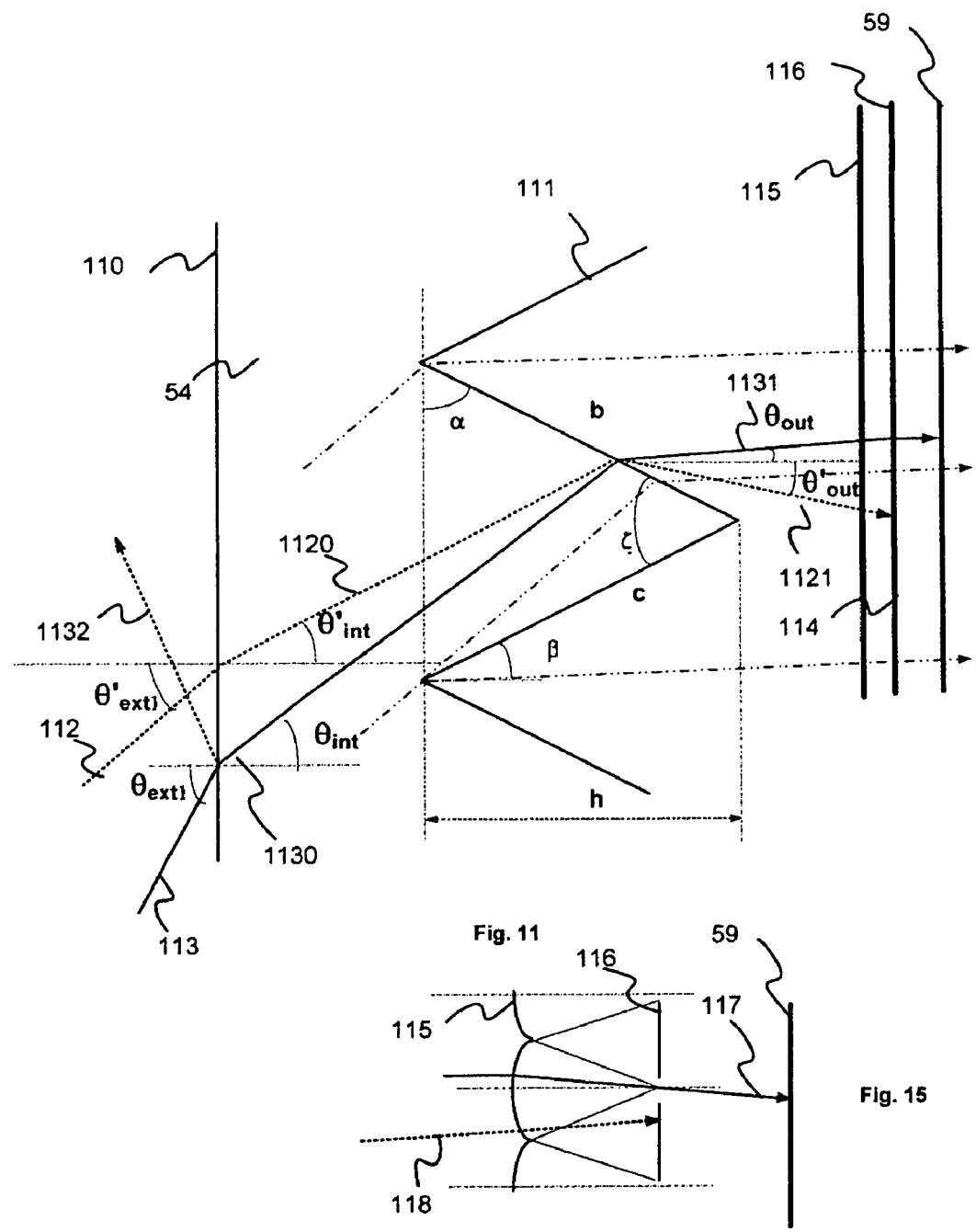
Figure 12:
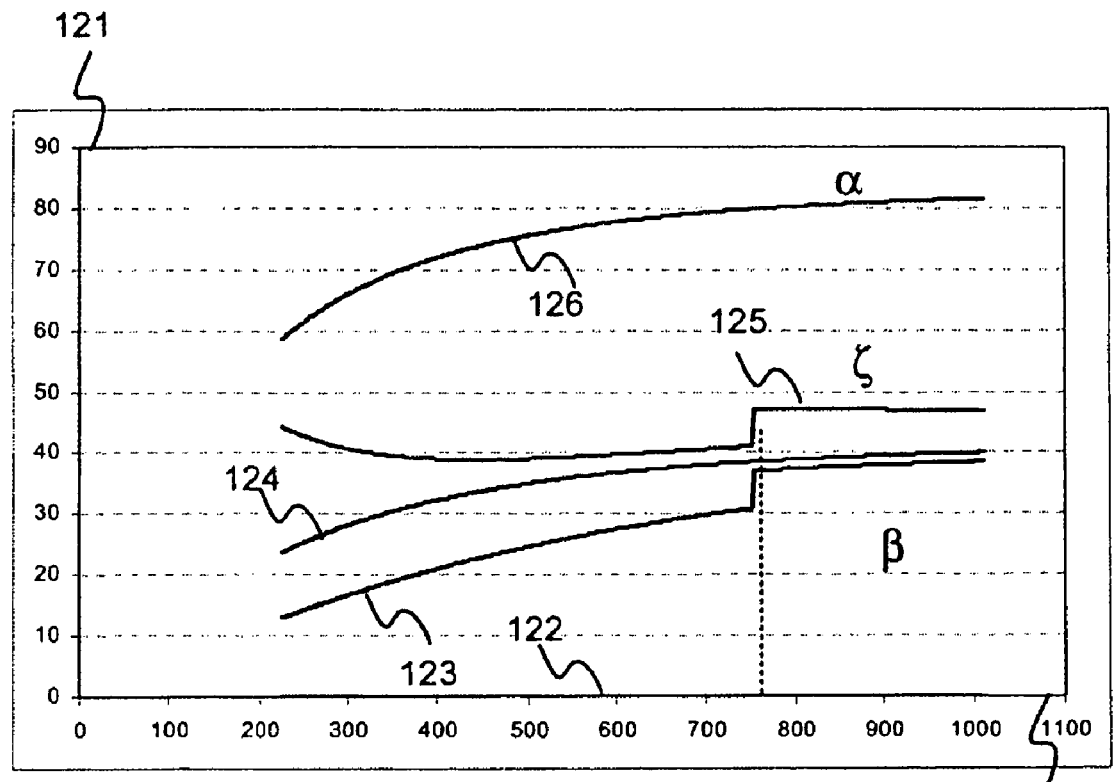
Figure 14:
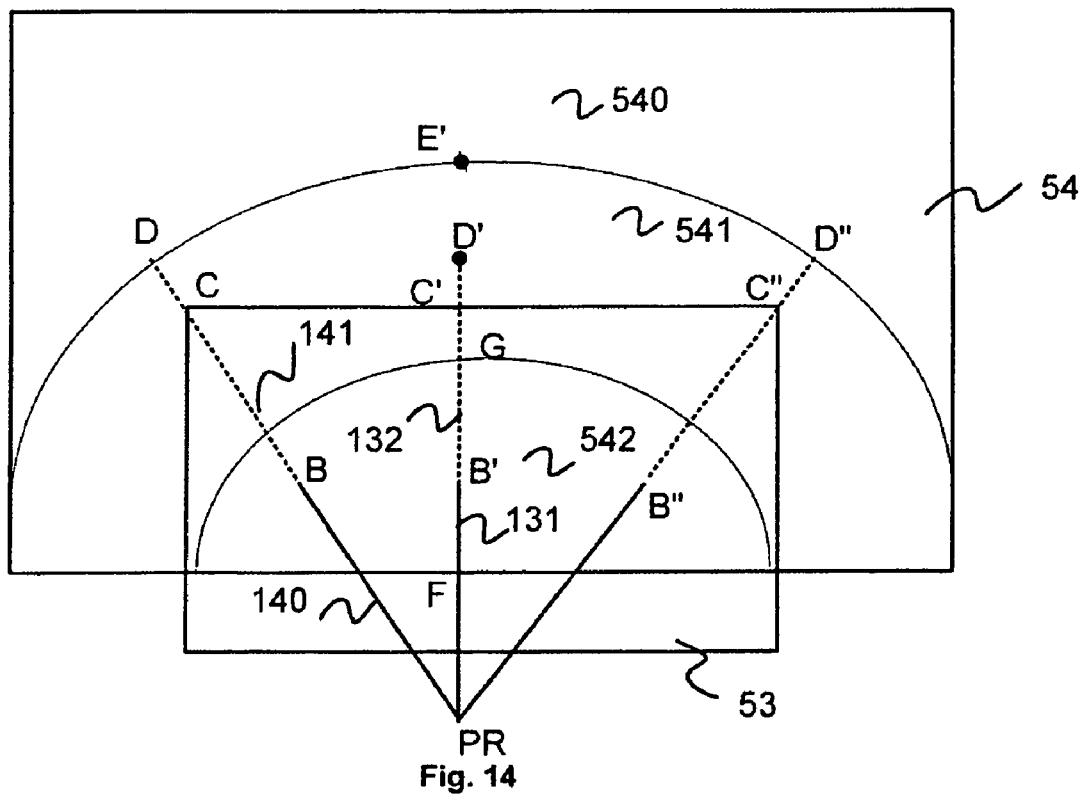

The various aspects and characterizing features of the invention will become more clearly apparent in the following description and in the appended figures which show:

FIGS. 1, 2a and 2b, examples of backprojection systems known in the prior art and already described above;

FIGS. 3a and 3b, an example of a Fresnel lens to which the invention applies;

FIGS. 4a and 4b, figures for explaining the invention;

FIGS. 5a to 5d, an example of a Fresnel lens produced according to the invention;

FIGS. 6a to 6c, curves illustrating the values of the angles characterizing the Fresnel lens according to the invention;

FIG. 7, curves illustrating the transmission of the p and s polarizations by the Fresnel lens according to the invention;

FIG. 8, an example of the Fresnel lens according to the invention applied to a backprojection unit;

FIGS. 9 and 10, a backprojection unit according to one particular embodiment of the invention;

FIGS. 11 and 15, details of a screen used in the unit of FIGS. 9 and 10;

FIGS. 13 and 14, a backprojection unit according to an embodiment of the invention; and FIG. 12, curves illustrating the values of the angles that characterize the Fresnel lens in the unit of FIGS. 13 and 14.

5. DETAILED DESCRIPTION OF THE INVENTION

A Fresnel lens according to the invention will now be described.

FIG. 3a shows a Fresnel lens FL comprising refractive structures of concentric prismatic shapes. As may be seen in this figure, only one portion of the circular plane of the lens is utilized, typically less than one half. FIG. 3b shows that this lens FL comprises a plane first face lying in a plane and, opposite this face, a second face parallel to the first face and including circular concentric refractive structures. The first face is illuminated by a source PR located on the optical axis XX' of the lens but of which only one portion of the lateral field of this source illuminates the lens. In FIG. 3b, this source PR is located on the axis XX' of the lens FL and illuminates only one portion of this lens that lies above the XX' axis. It illuminates the lens at oblique incidence with respect to the lens. The lower light ray 30 of the illuminating beam makes a relatively small angle of incidence $\theta_{ext}$ on the Fresnel lens, whereas the upper ray 31 of the beam makes a higher angle of incidence $\theta_{ext}$.

As shown in FIGS. 4a and 4b, each refractive structure element is bounded by a surface b (or face b) constituting the refractive diopter of this structure and a surface c (or face c) that is not optically utilized within the framework of FIGS. 4a and 4b. According to this embodiment, the Fresnel lens is bounded by a plane face a, serving as entrance face parallel to a reference plane P or plane of incidence, and by a face located to the right of the lens and bearing refractive structures each bounded by faces b and c.

In the rest of the description:

$\alpha$ denotes the angle of face b with the plane of incidence of the Fresnel lens;

$\beta$ denotes the angle of face c with the normal to the plane of incidence;

$\theta_{ext}$ denotes the angle of incidence of a light ray on the plane entrance face a of the Fresnel lens;

$\theta_{int}$ denotes the angle of incidence of a light ray with the normal to the plane of incidence (or entrance face of the Fresnel lens) after refraction through the plane entrance face a of the Fresnel lens;

$\zeta$ denotes the angle between two faces b and c, which may be called the machining angle or manufacturing angle; and h denotes the height of the refractive structures.

In a conventional structure, shown by the dotted lines in FIG. 4a, the faces such as c make an angle $\beta$ of about 3° with the normal to the plane of incidence P. Such a structure has narrow prismatic refraction elements with a great height h and a low angle $\zeta$, and it is therefore difficult to produce it in large numbers.

In general, the invention therefore aims to give the angle β values such that, for each refractive structure, face c is parallel to the light rays that the refractive structure receives. As shown in FIG. 4a, the height of the refractive structures is reduced to a height h' and the angle ζ is substantially larger. The prismatic elements are then easier to produce.

Moreover, in one application configuration as shown in FIG. 3b, if it is desired to obtain, as output from the Fresnel lens using the divergent beam emitted by the source PR, a collimated beam, for example collimated along a direction XX', face b of each refractive structure must make an angle α that is a function of the angle $\theta_{int}$ of the light rays that it receives.

To obtain such a result, each face b of the refractive structures is associated with a value of the angle α such that:

$$\alpha = arc\ \sin\{(n\ \sin\ \theta_{int})/[(1-n\ \cos\ \theta_{int})^2 + (n\ \sin\ \theta_{int})^2]^{1/2}\}.$$

The angle ζ between faces b and c of the prismatic refractive structures has a value equal to or greater than a manufacturing limit value $\zeta_{lim}$ (FIG. 5a) below which it would become particularly difficult for the prismatic elements to be manufactured economically.

This manufacturing limit value $\zeta_{lim}$ depends in particular on the manufacturing processes used and on the size of the lens.

However, when $\theta_{int}$ becomes too large, the value of the angle ζ runs a risk of becoming smaller than the value $\zeta_{lim}$. In order not to fall below this limit value, the angle α of each face b of the refractive structures must be adjusted, even when the angle $\theta_{int}$ of the rays that they receive increases. The refracted light is then no longer parallel to the XX' direction. The operation as shown in FIG. 5b is obtained.

The divergence thus obtained as output must however be maintained within an acceptable limit in order for the quality of the transmitted beam not to suffer. For larger angles of incidence $\theta_{int}$, it is therefore necessary to accept an angle α that depends on the angle of incidence $\theta_{int}$ and that limits the angle of divergence $\theta_{max}$ of the output beam. However, to keep the angle ζ at its manufacturing limit value $\zeta_{lim}$, it has to be accepted that each face c will make an angle β with the normal to the plane of incidence that is a function of the angle α. This means that $\beta = \zeta_{lim} - 90 + \alpha$ (FIG. 5c).

Figure 5A:
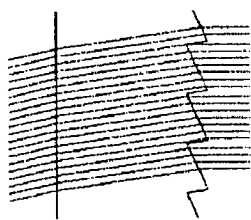
Figure 5B:
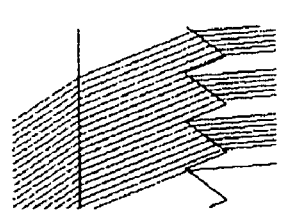
Figure 5C:
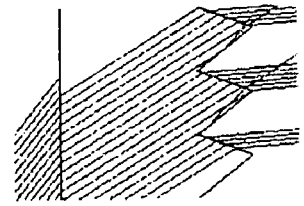
Figure 5D:
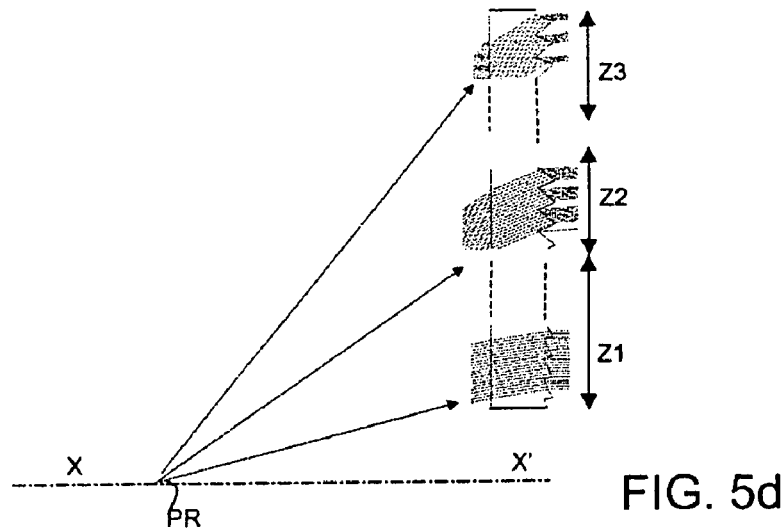

FIG. 5d shows a Fresnel lens incorporating the three structures of FIGS. 5a to 5c.

In a first zone Z1 located near the optical centre of the Fresnel lens, where the angle of incidence of the light coming from the source PR is smallest, a structure of the type shown in FIG. 5a is provided. Next, in an intermediate zone Z2, a structure such as that in FIG. 5b is provided. Finally, in a zone furthest away from the optical centre of the lens, where the angle of incidence of the light from PR is largest, a structure of the type shown in FIG. 5c is provided.

The values of the angles α, β and ζ as a function of the angle of incidence of the light $\theta_{int}$ on the second face of the Fresnel lens are therefore the following:

$$\alpha = arc\ \sin\ \{(n\ \sin\ \theta_{int})/[(1-n\ \cos\ \theta_{int})^2 + (n\ \sin\ \theta_{int})^2]^{1/2}\};$$

$$\beta = \theta_{int};$$

$$\zeta = 90 - \alpha + \beta,\ and\ \zeta \geq \zeta_{lim}.\qquad \text{ZONE Z1}$$

In this zone Z1, the output beam is parallel to the XX' axis. The output angle $\theta_{out}$ of the beam is zero relative to the normal to the plane P, i.e. $\theta_{out} = 0°$. The angle ζ is smaller than a limit value $\zeta_{lim}$.

$$\alpha = 90 - \zeta_{lim} + \beta;$$

$$\beta = \theta_{int};$$

$$\zeta = \zeta_{lim}.\qquad \text{ZONE Z2}$$

In this zone Z2, the output beam is slightly divergent relative to the direction of the XX' axis with an angle of divergence $\theta_{out}$ that is smaller than a maximum value $\theta_{max}$ set in advance. The angle ζ is also equal to the limit value $\zeta_{lim}$.

$$\alpha = arc\ \tan[(n\ \sin\ \theta_{int} - \sin\ \theta_{max})/(n\ \cos\ \theta_{int} - \cos\ \theta_{max})]$$

where $\theta_{max}$ is the maximum permissible value of the angle of divergence of the output beam;

$$\beta = \zeta - 90 + \alpha;$$

$$\zeta = \zeta_{lim}.\qquad \text{ZONE Z3}$$

In this zone Z3, the beam is slightly divergent relative to the direction of the XX' axis with an angle of divergence $\theta_{out}$ that is equal to a maximum divergence value $\theta_{max}$ set in advance ($\theta_{out} = \theta_{max}$) The angle ζ is also equal to the machining (or tooling) limit value $\zeta_{lim}$.

It should be noted that in this final zone Z3, there is a slight loss due to reflection of a small portion of the light on faces c of the refractive structures.

As an embodiment example, for a 16/9 format Fresnel lens having dimensions of 1107 mm by 622 mm produced in a "lens" (mould) 1.81 metres in diameter and with a focal length of 462 mm, and with the illumination source PR offset from the axis of the screen by 410 mm, it is possible to have external angles of incidence $\theta_{ext}$ that vary between 12° and 63°.

FIGS. 6a, 6b and 6c show, as continuous lines, curves 604, 614 and 624 providing the values of the angles ζ, α and β, respectively, as a function of the angle $\theta_{ext}$. These curves have been given for a $\theta_{out}$ value of less than $\theta_{max} = 5°$ and for a $\zeta_{lim}$ value equal to 60°. Of course, $\zeta_{lim}$ may take other values, depending on various embodiments of the invention, for example between 30° and 50°. The values of the angles of incidence $\theta_{ext}$ are plotted on the x-axes (axes 600). The values of the angles ζ, α and β are plotted on the respective y-axes (the axes 601, 611 and 621, respectively).

Shown as hatched lines are variation curves 602, 612 and 622 corresponding to a conventional Fresnel lens, while shown as dotted lines 603 and 623 for the curves in ζ and in β respectively are the truncated portions of the variation curves.

As may be seen on these curves, the zone where $0° < \theta_{ext} < 28°$ corresponds to the zone Z1 described above.

The zone where $\theta_{ext}$ is between 28° and 35° corresponds to the zone Z2.

The zone where $\theta_{ext}$ is between 35° and 63° corresponds to the zone Z3.

FIG. 7 provides curves that illustrate the efficiency of transmission of the p and s polarizations by the Fresnel lens according to the invention.

Plotted on the x-axes (axis 70) are the angles of incidence $\theta_{int}$ and plotted on the y-axes (axis 71) are the transmission efficiencies.

The upper two curves 73 and 75 show the transmission of the p polarization. The dotted curve 73 shows the transmission with a standard lens and the hatched curve 75 shows the transmission through the lens according to the invention. It may be seen that up to $\theta_{ext} = 40°$, the efficiencies are the same and that these deteriorate slightly, but within acceptable proportions, with the lens according to the invention.

The lower two curves 72 and 74 show the transmission of the s polarization. The continuous line curve 72 relates to a standard lens and the curve 74 surrounded by circles relates to the lens according to the invention. It may be seen that up to 30° the efficiencies are the same. Between 30° and 45°, the efficiency of the lens according to the invention is better. Above 45°, the efficiencies are the same.

Overall, the efficiency of the lens according to the invention is as good as a conventional lens. However, the Fresnel lens according to the invention operates under illumination at high angles of incidence and its manufacture poses no tricky problem because of the angle ζ, which is relatively high (around 60°).

The Fresnel lens is more particularly applicable to a backprojection screen. FIG. 8 shows a backprojection unit. The Fresnel lens FL according to the invention, placed parallel to a plane P, is juxtaposed with the backprojection screen BS with its face bearing the refractive structures placed facing the screen. The plane face of the lens FL is illuminated by a projector PR, which is located along the optical axis XX' of the lens and below the latter, only the useful portion of which has been shown, that is to say the portion illuminated by the projector PR that therefore illuminates the lens at a relatively high angle of incidence.

According to one embodiment of the invention, the optical axis of the objective is collinear with the axis XX' of the lens.

According to an alternative embodiment of the invention, the objective pupil is located on the axis XX' of the Fresnel lens. However, the axis of the objective is not collinear with the axis XX' of the Fresnel lens. For example, the objective may be oriented so that its axis passes through the centre of the utilized portion of the Fresnel lens, that is to say through the centre of the screen. Of course, the lens is located at the image provided by the objective and in the plane of this image. This configuration is illustrated for example by FIG. 8.

FIG. 9 illustrates a backprojection unit 5 according to one embodiment of the invention that is particularly suitable for eliminating parasitic images that may be visible when parasitic rays are generated by reflection on the plane face of the Fresnel lens 54 and then on a folding mirror 53. This alternative embodiment of the invention is also very suitable for producing particularly compact backprojection units providing high-quality images and also for corresponding Fresnel lenses that are easy to produce.

More precisely, the backprojection unit 5 comprises imaging means 50 comprising an objective 51 that emits an imaging beam from an imaging source PR (pupil centre) towards a first folding mirror 52 and then a second folding mirror 53 (so as to make the unit 5 compact) and the Fresnel lens 54. The screen of the unit 5 comprises the Fresnel lens 54, a black matrix 58 (forming means for filtering out parasitic rays) and a diffuser 59.

The imaging beam has a rectangular cross section matched to the projection screen and is limited in its bottom part by a ray 57 and in its top part by a ray 56 about the axis of the ray 52, which is off-axis relative to the optical axis of the objective 51. It should be noted that, according to the embodiment described, the angles of incidence of the imaging beam are particularly high.

FIG. 10 explains in detail the propagation path of certain rays of the imaging beam. Thus, two incident rays reach a point N on the Fresnel lens 54, namely:

a direct incident ray 62 forming part of the imaging beam, shown by the solid line; and a parasitic incident ray 60 belonging to a parasitic beam, shown as the dotted line.

The direct incident ray 62 comes from the source PR via the objective 51 after two successive reflections, on the folding mirrors 52 and 53 respectively. The parasitic incident ray 60 is obtained by reflection of a direct incident ray 61 on the plane face of the Fresnel lens 54 at the point N' and then on the folding mirror 53 at the point N".

FIG. 11 shows a detail of one zone of the Fresnel lens 54. In this figure, the notations for faces a, b and c, and also for the angles α, β, ζ, $ζ_{lim}$, are the same as those shown with regard to FIG. 4b.

Depending on the embodiment of the Fresnel lens 54, in a first zone of the Fresnel lens, the face c of a refractive diopter of this zone is parallel to the entrance beam of a parasitic incident ray 1120 obtained by reflection of a parasitic incident ray 112 on the plane face 110 of the Fresnel lens 54. Thus, the angle β is equal to the entrance angle $θ_{int}$ of the parasitic incident ray 1120.

In the zone in question, an imaging incident ray 113 is split into two rays by being incident on the plane face 110, namely an imaging incident ray 1130 obtained by reflection of the ray 113 on the plane face 110, and a parasitic ray 1132 obtained by reflection on the plane face 110. The incident ray 113 and the parasitic ray 1132 make an angle $θ_{ext1}$ with the normal to the plane face 110. The incident ray 112 makes an angle $θ'_{ext1}$ that is smaller than $θ_{ext1}$.

The imaging incident ray 1130 makes an entrance angle $θ_{int}$ larger than $θ'_{int}$ ($θ_{int}$ and $θ'_{int}$ depending directly on the angles $θ_{ext1}$ and $θ'_{ext1}$ as a function of the index of the material used for the Fresnel lens). It therefore strikes face b of the refractive diopter in question and is refracted by face b, forming an output ray 1131 parallel to the XX' axis (the output angle $θ_{out}$ is zero).

According to the embodiment described, since face c is parallel to the parasitic incident ray 1120, the latter also strikes face b of the refractive diopter in question and is refracted by face b forming an output ray 1121 that is not parallel to the XX' axis (the output angle $θ'_{out}$ is not zero).

According to an alternative embodiment of the invention, the angle β lies between a lower limit equal to $θ'_{int}$ less 10 degrees and an upper limit equal to $θ'_{int}$ plus 2 degrees. Thus a 10 degree tolerance is provided on the beam aperture. A tolerance on the parasitic beam of about 2° is also permitted. Since the angle β is smaller than the entrance angle $θ'_{int}$ plus 2°, most of the parasitic rays are eliminated. According to other embodiments of the invention, a tighter tolerance and the lower limit equal to $θ'_{int}$ less 5 degrees are considered. The larger β, the easier the machining. The smaller β, the more the parasitic rays are eliminated. Furthermore, according to yet other embodiments (which may be combined with the above embodiments corresponding to a specific lower limit), the upper limit is equal to the entrance angle $θ'_{int}$ in order to remove all the parasitic rays obtained by reflection on the folding mirror 53.

According to yet other embodiments of the invention, the angle β is greater than 5 degrees and preferably greater than 10 degrees. Thus, the parasitic rays are taken into account for moderate or high angles of incidence of the parasitic rays.

FIG. 15 illustrates the path of the refracted rays 1121 and 1131 in a top view of a detail of the black matrix 58 and of the diffuser 59.

The black matrix comprises:

vertical black bands or absorbent bands 116 separated by transparent bands; and vertical cylindrical lenses 115 that focus rays 117 of the imaging beam onto the transparent bands and most of the parasitic rays 118 onto the black bands 116.

Thus, the imaging beam is diffused towards a viewer by the diffuser 59, whereas most of the parasitic rays are eliminated. In particular, the diffuser eliminates certain parasitic rays by diffusing them downwards or upwards, so that they are not seen by a viewer facing the projector.

According to an alternative embodiment of the invention, the means for filtering the parasitic rays comprises, in addition to or instead of the black matrix 58, a filter comprising concentric circular black bands separated by transparent zones. This filter is placed between the lens 54 and the black matrix 58 or between the lens 54 and the diffuser 59 (in the absence of a black matrix 58). A transparent zone is placed facing each face b of the refractive diopter so as to let through those rays of the imaging beam that are refracted by the Fresnel lens. An absorbent band or black band is placed between two transparent zones in order to eliminate the parasitic rays (such as the ray 118 or 1121) that could be transmitted into this zone.

To keep the angle $\zeta$ at its manufacturing limit value $\zeta_{lim}$, the lens 54 comprises three zones that depend on the angles $\alpha$ and $\beta$, which are similar to those described with regard to FIGS. 5a to 5d. However, it should be noted that the value of the angle $\beta$ depends on the entrance angle of a parasitic incident ray and not on the entrance angle of a direct incident ray. Thus, the following zones are provided:

a first zone Z1 located nearest the optical centre of the Fresnel lens in which the angle of incidence of the parasitic rays obtained by reflection of the light coming from the source PR on the plane face of the lens and then on the folding mirror is smaller, in which zone a structure in which the output beam is parallel to the XX' axis is provided: the output angle $\theta_{out}$ of the beam is zero relative to the normal to the plane P ($\theta_{out}=0°$). The angle $\zeta$ is smaller than a limit value $\zeta_{lim}$. The values of the angles $\alpha$, $\beta$ and $\zeta$, which depend on the angles of incidence $\theta_{int}$ and $\theta'_{int}$, are therefore the following:

$\alpha = arc \sin \{(n \sin \theta_{int})/[(1-n \cos \theta_{int})^2 + (n \sin \theta_{int})^2]^{1/2}\}$;

$\beta = \theta'_{int}$;

$\zeta = 90 - \alpha + \beta$ and $\zeta \geq \zeta_{lim}$;

an intermediate zone Z2, in which the output beam is slightly divergent relative to the direction of the XX' axis with an angle of divergence $\theta_{out}$ that is smaller than a predetermined maximum value $\theta_{max}$. The angle $\zeta$ is equal to the limit value $\zeta_{lim}$. In this zone, the values of the angles $\alpha$, $\beta$ and $\zeta$ are therefore the following:

$\alpha = 90 - \zeta_{lim} + \beta$ $\beta = \theta_{int}$ $\zeta = \zeta_{lim}$; and a zone Z3 furthest from the optical centre of the lens, in which zone the angle of incidence of the light from PR is highest and the beam is slightly divergent relative to the direction of the XX' axis with an angle of divergence $\theta_{out}$ equal to a predetermined maximum divergence value $\theta_{max}$ ($\theta_{out}=\theta_{max}$). The angle $\zeta$ is equal to the limit value $\zeta_{lim}$. In this zone, the values of the angles $\alpha$, $\beta$ and $\zeta$ are therefore the following:

$\alpha = arc \tan[(n \sin \theta_{int} - \sin \theta_{max})/(n \cos \theta_{int} - \cos \theta_{max})]$ $\beta = \zeta - 90 + \alpha$ $\zeta = \zeta_{lim}$.

As an embodiment example, for a Fresnel lens of 16/9 format with dimensions of 1107 mm by 622 mm produced in a "lens" (mould) having a diameter of 1.81 metres and a focal length of 462 mm, with the illumination source PR off axis with respect to the axis of the screen by 410 mm, it is possible to have angles of incidence $\theta_{ext}$ that vary between 12° and 63°.

FIGS. 13 and 14 illustrate respectively a side view and a front view of the Fresnel lens 54 and of the folding mirror 53 according to one version of the backprojection unit 5 in one particular embodiment of the invention. According to this version, the zone Z1 of the Fresnel lens 54 is divided into three portions:

a lower portion 542 and an upper portion 540 in which face c of each refractive diopter is parallel to a direct incident ray: the angle $\beta$ is equal to the angle $\theta_{int}$. A refractive diopter belonging to the portions 540 or 542 is therefore as shown with regard to FIG. 4b; and an intermediate portion 541 in which face c of each refractive diopter is parallel to a parasitic incident ray obtained by reflection of a direct incident ray on the plane face of the Fresnel lens 54 and then on the folding mirror 53: the angle $\beta$ is equal to the angle $\theta'_{int}$. A refractive diopter belonging to the portion 541 is therefore as shown with regard to FIG. 11.

The intermediate portion 541 corresponds to a portion of the Fresnel lens 54 capable of receiving parasitic incident rays, as defined above. Thus, the bottom portion is defined by a circular arc on which a point G lies. The point G is the point of impact on the Fresnel lens 54 of a parasitic ray 130 obtained by reflection of a direct incident ray 57 on the lower limit of the Fresnel lens 54 (point F) and then on the folding mirror 53.

Likewise, the top portion of the intermediate zone 541 is defined by a circular arc on which points D and D" lie. The point D (respectively D") is the point of impact on the Fresnel lens 54 of a parasitic ray 141 obtained by reflection of a direct incident ray 140 on the Fresnel lens 54 at the point B (respectively at the point B") and then on an upper angle on the folding mirror 53 at the point C (respectively C").

A parasitic incident ray 132 lying in the plane of symmetry normal to the Fresnel lens 54 strikes the Fresnel lens 54 in the central upper portion at a point D' after reflection of a direct incident ray 131 at a point B' on the Fresnel lens 54 and then at a point C' on the upper limit of the folding mirror 53. For ease of machining or moulding reasons, the point D' is located within the portion 541 below a point E' that marks the upper limit of the portion 541. The point E' is located on the same circular refractive diopter as the points D and D". Since the folding mirror 53 is rectangular, the point D' is therefore not located on the limit of the zone 540.

According to one embodiment of the invention, the intermediate portion 541 extends beyond the possible target zone of a parasitic ray. In particular, it may cover the entire lower portion of the lens 54 and comprise the equivalent of the portions 542 and/or 540 and of the portion 541 that were defined above. The angle $\beta$ is then equal to the angle $\theta'_{int}$ of a parasitic ray obtained by reflection of a beam coming from the illuminating source PR on a plane in which the plane face of the Fresnel lens 54 lies and then on a plane in which the folding mirror 53 lies. This amounts to extending the reflection surfaces that generate the parasitic rays.

FIG. 12 illustrates the representative angles (expressed in degrees along the axis 121) of a refractive diopter as a function of the radius r of the circular refractive structure to which it belongs, along the axis 120 in which the distances are expressed in millimetres.

The curves 126 and 124 represent the values of $\alpha$ and $\theta_{int}$, respectively.

Thus, for a distance r of less than 75 mm:

$\beta$, represented by the curve 123, coincides with $\theta'_{int}$, which is smaller than $\theta_{int}$ (portion 541); and then $\beta$ is coincident with $\theta_{int}$; and $\zeta$, represented by the curve 125, varies as a function of $\alpha$ and $\beta$ according to equation $\zeta=\beta+90-\alpha$.

In the zone represented, which corresponds to the zone Z1, the output angle of an imaging beam $\theta_{out}$, represented by the curve 122, is zero.

It should be noted that since the system is preferably off-axis, the object to be projected and the projected image are not on the axis. The curves are therefore defined for strictly positive values of the radius r.

Of course, the invention is not limited to the embodiments described above.

A person skilled in the art may in particular adapt the invention to backprojection units possessing a different structure, in particular to units having folding mirrors that are not necessarily plane, in particular aspherical mirrors. In a system comprising an imaging source, a Fresnel lens and at least one return mirror, according to one embodiment of the invention the Fresnel lens comprises at least one portion in which the angles $\beta$ (that the optically non-useful faces c of the refractive diopters make with the normal to the plane of incidence) are equal to the entrance angles of the parasitic rays obtained by reflection on the Fresnel lens and then on the last return mirror. The entrance angles of these parasitic rays are therefore defined unambiguously as a function of the incoming imaging beam, the position of the last folding mirror with respect to the Fresnel lens and the shape of the last folding mirror.

Furthermore, when, in this embodiment, the folding mirror is plane, it is not necessarily parallel to the Fresnel lens.

Also according to this embodiment of the invention, the Fresnel lens comprises, depending on the maximum tooling angle $\zeta_{lim}$ of the refractive diopters, either a combination of the zones Z1, Z2 and Z3 as defined above, or a combination of the zones Z1 and Z2, or preferably only the zone Z1 when the tooling limit value so allows, it being possible for the zone Z1 to be divided into several portions (each of the portions corresponding to one value of the angle $\beta$ as a function of the entrance angle of an incident ray, either a direct one or a parasitic one).

The invention claimed is:

1. Fresnel lens comprising:
   a first face lying in a plane; and
   opposite this face, a second face parallel to the first face; and including circular concentric refractive structures, each refractive structure being defined by:
      a first surface intended to form a refractive diopter and making a first angle with the said plane and
      a second surface without optical purpose and making a second angle with the normal to the said plane,
   each said structure being intended to be illuminated by a beam making an entrance angle different from zero degrees with the normal to the said plane, the directions of said beam and of said normal being substantially different, wherein the second face has at least two zones of refractive structures distributed between the centre of the concentric refractive structures and the periphery of the Fresnel lens:
      a first zone close to the centre, in which:
         the first angle of each first surface is such that the refractive structures refract the said beam along a direction making a zero angle relative the optical axis of said lens and
         the second angle of each second surface is equal to the said entrance angle;
      a second zone in which:
         the first angle of each first surface is such that the refractive structures refract the said beam along a direction making a non-zero angle smaller than a maximum value relative to the optical axis and
         the second angle of each second surface is equal to the said entrance angle.

2. Fresnel lens according to claim 1, wherein it also includes at least a third zone located between the second zone and the periphery of the lens, in which third zone:
   the first angle of each first surface is such that the refractive structures refract the light along a direction making a non-zero angle equal to the said maximum value relative to the optical axis; and
   the second angle of each second surface is greater than the said entrance angle.

3. Fresnel lens according to claim 2, wherein each first surface makes an etching angle with each adjacent second surface, this angle having a specified value in both the second and the third zones and having a value greater than this specified value in the first zone.

4. Fresnel lens according to claim 2, wherein each first surface makes an etching angle with each adjacent second surface, this angle having a specified value in both the second and the third zones and having a value greater than this specified value in the first zone, the said specified value of the etching angle is less than 70°.

5. Fresnel lens according to claim 1, wherein the first face is plane.

6. Fresnel lens according to claim 1, wherein the first face receives an antireflection treatment optimized for high angles of incidence of an incident beam.

7. Fresnel lens according to claim 1, wherein the numerical aperture equal at most to half the ratio of the focal length associated with a point on the lens to the distance of this point from the axis of the lens is equal to 0.55 or less.

8. Image back projection screen comprising an entrance face and an exit face to be directed towards viewers, wherein it includes a Fresnel lens that is-placed along the entrance face of the screen with that face of the lens bearing the refractive structures directed towards the exit face of the screen, the Fresnel lens comprising:
   a first face lying in a plane; and
   opposite this face, a second face parallel to the first face; and including circular concentric refractive structures, each refractive structure being defined by:
      a first surface intended to form a refractive diopter and making a first angle with the said plane and
      a second surface without optical purpose and making a second angle with the normal to the said plane,
   each said structure being intended to be illuminated by a beam making an entrance angle different from zero degrees with the normal to the said plane, the directions of said beam and of said normal being substantially different, the second face has at least two zones of refractive structures distributed between the centre of the concentric refractive structures and the periphery of the Fresnel lens:
  a first zone close to the centre, in which:
    the first angle of each first surface is such that the refractive structures refract the said beam along a direction making a zero angle relative the optical axis of said lens and
    the second angle of each second surface is equal to the said entrance angle;
  a second zone in which:
    the first angle of each first surface is such that the refractive structures refract the said beam along a direction making a non-zero angle smaller than a maximum value relative to the optical axis and
    the second angle of each second surface is equal to the said entrance angle.

9. System designed for image projection, comprising:
  a source generating an imaging beam;
  a Fresnel lens; and
  an imaging beam deflection mirror designed to send the said imaging beam back to the said Fresnel lens;
  the Fresnel lens having:
    a first face lying in a plane; and
    opposite this face, a second face parallel to the first face and having circular concentric refractive structures,
  each refractive structure being bounded by a first surface, intended to form a refractive diopter and making a first angle with the said plane, and a second surface without optical purpose and making a second angle with the normal to the said plane,
  wherein at least one portion of the said structures, forming a first set of structures, is intended to be illuminated by:
    a first beam, called the direct beam, which emanates from the said imaging beam and has not been reflected by the said first face, the said direct beam forming a first incident beam by the said direct beam being transmitted through the said Fresnel lens; and
    a second beam, called the parasitic beam, which emanates from the said imaging beam and has been reflected by the said first face and then by the said deflection mirror, the said parasitic beam forming a second incident beam by the said parasitic beam being transmitted through the said Fresnel lens;
  the said second incident beam making an entrance angle different from zero degrees with the normal to the said plane, the second angle of the second face of each structure of the said first set being larger than the said entrance angle of the said second incident beam less 10 degrees; and the second angle of the second face of each structure of the said first set being smaller than an upper limit equal to the said entrance angle of the said second incident beam plus 2 degrees
  so that said first and second incident beams strike the first surface of a refractive diopter and are transmitted to two distinct directions; and
  wherein said system comprise filtering means comprising absorbing zones stroke by said second incident beam transmitted by the Fresnel lens and transparent zones, the first beam transmitted by the Fresnel lens going through transparent zones.

10. System according to claim 9, wherein the second angle of the second face of each structure of the said first set is larger than 5 degrees.

11. System according to claim 9, wherein the second angle of the second face of each structure of the said first set is equal to the said entrance angle of the said second incident beam.

12. System according to claim 9, wherein the said Fresnel lens comprises at least two portions, including:
  a first portion in which the second angle of the second face of each structure of the said first set is equal to the said entrance angle of the said second incident beam; and
  a second portion in which the second angle of the second face of each structure of a second set of structures is equal to the said entrance angle of the said first incident beam.

13. System according to claim 9, wherein the second face comprises at least two zones of refractive structures distributed between the centre of the concentric refractive structures and the periphery of the Fresnel lens:
  a first zone close to the centre, in which the first angle of each first surface is such that the refractive structures refract the first incident beam along a direction making a zero angle relative to the optical axis of said lens; and
  a second zone in which the first angle of each first surface is such that the refractive structures refract the first incident beam along a direction making a non-zero angle smaller than a maximum value relative to the optical axis.

14. System according to claim 9, wherein it further includes a lenticular screen comprising filtering means that are transparent for the first incident rays refracted by the said Fresnel lens and that filter the second incident rays refracted by the said Fresnel lens, the said filtering means being juxtaposed with the said Fresnel lens.

15. System according to claim 9, wherein it includes an image back projection screen comprising an entrance face and an exit face to be directed towards viewers, the said screen comprising the said Fresnel lens, this Fresnel lens being placed along the entrance face of the screen with that face of the lens bearing the refractive structures directed towards the exit face of the screen.

16. System according to claim 9, wherein the numerical aperture equal at most to half the ratio of the focal length associated with a point on the lens to the distance of this point from the axis of the said Fresnel lens is equal to 0.55 or less.

17. Back projection unit, wherein it comprises:
  an image back projection screen comprising an entrance face and an exit face to be directed towards viewers, and a Fresnel that is-placed along the entrance face of the screen with that face of the lens bearing the refractive structures directed towards the exit face of the screen, and
  a projector that emits a light beam towards the Fresnel lens of the said screen,
  the Fresnel lens comprising:
    a first face lying in a plane; and
    opposite this face, a second face parallel to the first face; and including circular concentric refractive structures,
    each refractive structure being defined by:
      a first surface intended to form a refractive diopter and making a first angle with the said plane and
      a second surface without optical purpose and making a second angle with the normal to the said plane, each said structure being intended to be illuminated by a beam making an entrance angle different from zero degrees with the normal to the said plane, the directions of said beam and of said normal being substantially different,
  the second face has at least two zones of refractive structures distributed between the centre of the concentric refractive structures and the periphery of the Fresnel lens:

a first zone close to the centre, in which:
the first angle of each first surface is such that the refractive structures refract the said beam along a direction making a zero angle relative the optical axis of said lens and
the second angle of each second surface is equal to the said entrance angle;
a second zone in which:
the first angle of each first surface is such that the refractive structures refract the said beam along a direction making a non-zero angle smaller than a maximum value relative to the optical axis and
the second angle of each second surface is equal to the said entrance angle.

18. Backprojection unit according to claim 17, wherein the projector is placed on the axis of the Fresnel lens and projects an image onto only one portion of the Fresnel lens located on one side of its axis.

* * * * *